(12) United States Patent
Szeto et al.

(10) Patent No.: US 10,402,657 B2
(45) Date of Patent: Sep. 3, 2019

(54) METHODS AND SYSTEMS FOR TRAINING AN OBJECT DETECTION ALGORITHM

(71) Applicant: SEIKO EPSON CORPORATION, Tokyo (JP)

(72) Inventors: Hiu Lok Szeto, Richmond Hill (CA); Syed Alimul Huda, Scarborough (CA); Jia Li, Aurora (CA)

(73) Assignee: SEIKO EPSON CORPORATION, Tokyo (JP)

( * ) Notice: Subject to any disclaimer, the term of this patent is extended or adjusted under 35 U.S.C. 154(b) by 29 days.

(21) Appl. No.: 15/808,387

(22) Filed: Nov. 9, 2017

(65) Prior Publication Data

US 2018/0137366 A1 May 17, 2018

(30) Foreign Application Priority Data

Nov. 15, 2016 (JP) ................ 2016-222221

(51) Int. Cl.
*G06K 9/00* (2006.01)
*G06T 7/73* (2017.01)
(Continued)

(52) U.S. Cl.
CPC ....... *G06K 9/00744* (2013.01); *G06K 9/6212* (2013.01); *G06T 7/251* (2017.01); *G06T 7/74* (2017.01); *G06K 9/46* (2013.01); *G06T 2207/10016* (2013.01); *G06T 2207/20081* (2013.01)

(58) Field of Classification Search
CPC .... G06K 9/00744; G06K 9/6212; G06K 9/46; G06T 7/251; G06T 7/74; G06T 2207/10016; G06T 2207/20081
See application file for complete search history.

(56) References Cited

U.S. PATENT DOCUMENTS

| | | | |
|---|---|---|---|
| 2013/0051626 A1 | 2/2013 | Abadpour et al. | |
| 2015/0235380 A1* | 8/2015 | Hayashi | G06K 9/00208 382/103 |
| 2017/0287165 A1* | 10/2017 | Lam | G06T 7/75 |

FOREIGN PATENT DOCUMENTS

JP  2013-050947 A  3/2013

OTHER PUBLICATIONS

Jaramillo et al. "6-DoF Pose Localization in 3D Point-Cloud Dense Maps Using a Monocular Camera." IEEE International Conference on Robotics and Biomimetics (ROBIO), Dec. 12, 2013, pp. 1747-1752 (Year: 2013).*

* cited by examiner

Primary Examiner — Jon Chang
(74) Attorney, Agent, or Firm — Oliff PLC

(57) ABSTRACT

A method comprising: acquiring, from a camera, a video sequence of a real object; deriving a pose of the real object included in at least one image frame using a 3D model corresponding to the real object in the case where the at least one image frame is selected from the video sequence; tracking or deriving the pose of the real object included in image frames in the video sequence in forward and/or backward directions from the at least one image frame; and storing, for at least one of the tracked or derived pose, appearance information obtained from the corresponding image frame and data of a 2D model obtained from a projection of the 3D model using the corresponding tracked pose so that the appearance information and the data of the 2D model are associated with the corresponding tracked or derived pose.

10 Claims, 13 Drawing Sheets

(51) Int. Cl.
*G06K 9/46* (2006.01)
*G06K 9/62* (2006.01)
*G06T 7/246* (2017.01)

METHODS AND SYSTEMS FOR TRAINING AN OBJECT DETECTION ALGORITHM

BACKGROUND

1. Technical Field

This disclosure relates to image processing.

2. Related Art

As a method for estimating a pose of an object captured in an image with a camera, JP-A-2013-50947 discloses a technique of estimating a pose of an object by creating a binary mask of an input image including an image of the object, extracting singlets as points inside the object and in an outer contour of the object from the binary mask, and connecting the set of singlets into a mesh expressed as a duplex matrix.

SUMMARY

Object recognition (object detection) includes both detecting an object of interest in a scene and specifying its pose (translation and orientation) relative to a predetermined 3D coordinate system. In order to solve the object recognition problem using color or luminance information from an RGB/luminance image and improve detection accuracy and pose specification accuracy, it is preferable that a computer vision system stores appearances (appearance information) of the object as viewed from various viewpoints, normally during an offline training phase.

However, creating training data (templates) including appearances of the object requires prior knowledge in the fields of computer vision and object recognition and therefore is not easy for an ordinary user to handle.

If a 3D CAD model accompanying texture information (that is, texture map) is available for the creation of training data (templates), it is possible to perform photorealistic rendering (drawing onto a 2D plane with a sense of reality like a photograph) of an object from different viewpoints (views). The accuracy of the created image depends on factors related to the resolution of appearance information (texture information) provided, and simulated lighting. However, such 3D CAD models are far from being widely available. That is, the user cannot necessarily obtain a 3D CAD model accompanying such appearance information with respect to a real object to be detected.

An aspect of the disclosure is directed to a non-transitory computer readable medium that embodies instructions that cause one or more processors to perform a method including: acquiring, from a camera, a video sequence of a real object; deriving a pose of the real object included in at least one image frame using a 3D model corresponding to the real object in the case where the at least one image frame is selected from the video sequence; tracking or deriving the pose of the real object included in image frames in the video sequence in forward and/or backward directions from the at least one image frame; and storing, for at least one of the tracked or derived pose, appearance information obtained from the corresponding image frame and data of a 2D model obtained from a projection of the 3D model using the corresponding tracked pose so that the appearance information and the data of the 2D model are associated with the corresponding tracked or derived pose.

Another aspect of the disclosure is directed to a non-transitory computer readable medium that embodies instructions that cause one or more processors to perform a method including: detecting feature elements based at least on an image frame obtained from capturing a real object with a camera; and generating a template using a 3D model corresponding to the real object and appearance information of the real object in the case where the number of the feature elements is equal to or greater than a threshold value.

The disclosure can be realized in various configurations other than the above. For example, the disclosure can be realized in the form of a head-mounted display device executing the program.

BRIEF DESCRIPTION OF THE DRAWINGS

The disclosure will be described with reference to the accompanying drawing, wherein like numbers reference like elements.

DESCRIPTION OF EXEMPLARY EMBODIMENTS

A. First Embodiment

A-1. Configuration of Image Processing System

Figure 1:
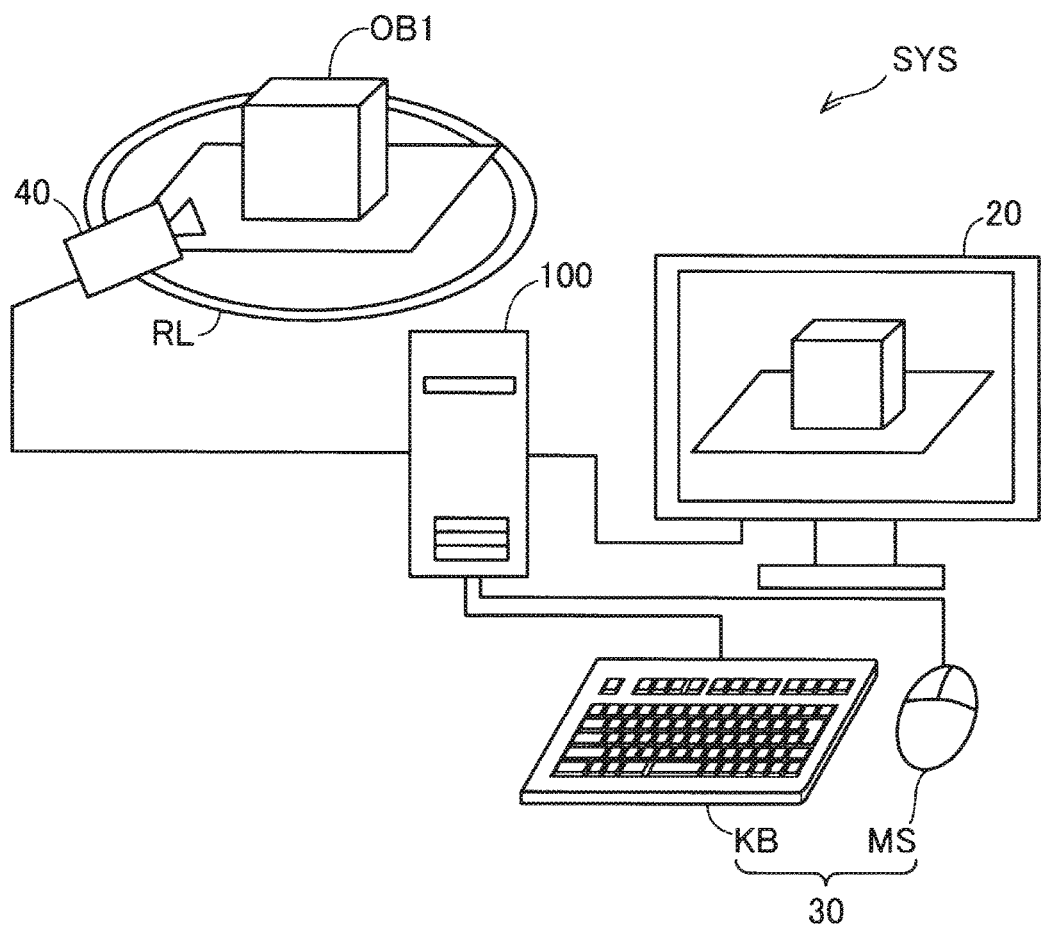
FIG. 1 shows a schematic configuration of an image processing system.

FIG. 1 is a schematic configuration of an image processing system SYS in the present embodiment. The image processing system SYS images a target real object OB1, and creates new association data in which captured image data of the imaged real object OB1 is associated with data of a 3D model of the real object OB1, stored in advance.

The image processing system SYS includes a main body section 100, an imaging section 40, or a camera 40, a display section 20, and an operation section 30. The main body section 100 is electrically connected to the display section 20, the operation section 30, and the imaging section 40. The main body section 100 transmits control signals to the display section 20, the operation section 30, and the imaging section 40 so as to control the sections. Details of control performed by the main body section 100 will be described later.

The imaging section 40 images external scenery on the basis of the control signal transmitted from the main body section 100. In the present embodiment, the imaging section 40 can be moved along a circular rail RL centering on a specific axis. The imaging section 40 is moved along the rail RL on the basis of the control signal by an actuator 41 (refer to FIG. 2). In the present embodiment, the real object OB1 is disposed on the specific axis, and thus the imaging section 40 can image the real object OB1 while being rotated by 360 degrees. The real object OB1 corresponds to a real object in the appended claims.

The display section 20 is a display which can display an image. The display section 20 displays an image on the basis of the control signal transmitted from the main body section 100. In the example illustrated in FIG. 1, the display section 20 displays a captured image obtained by the imaging section 40.

The operation section 30 is a user interface for receiving a user's operation. As illustrated in FIG. 1, the operation section 30 includes a keyboard KB and a mouse MS. The keyboard KB has a plurality of buttons for judging the presence or absence of determination when being pressed. The keyboard KB transmits a control signal corresponding to a pressed button to the main body section 100. The mouse MS has two buttons for judging the presence or absence of determination when positions thereof are changed and when the buttons are pressed. The mouse MS transmits control signals corresponding to a positional change and the presence or absence of determination, to the main body section 100.

Figure 2:
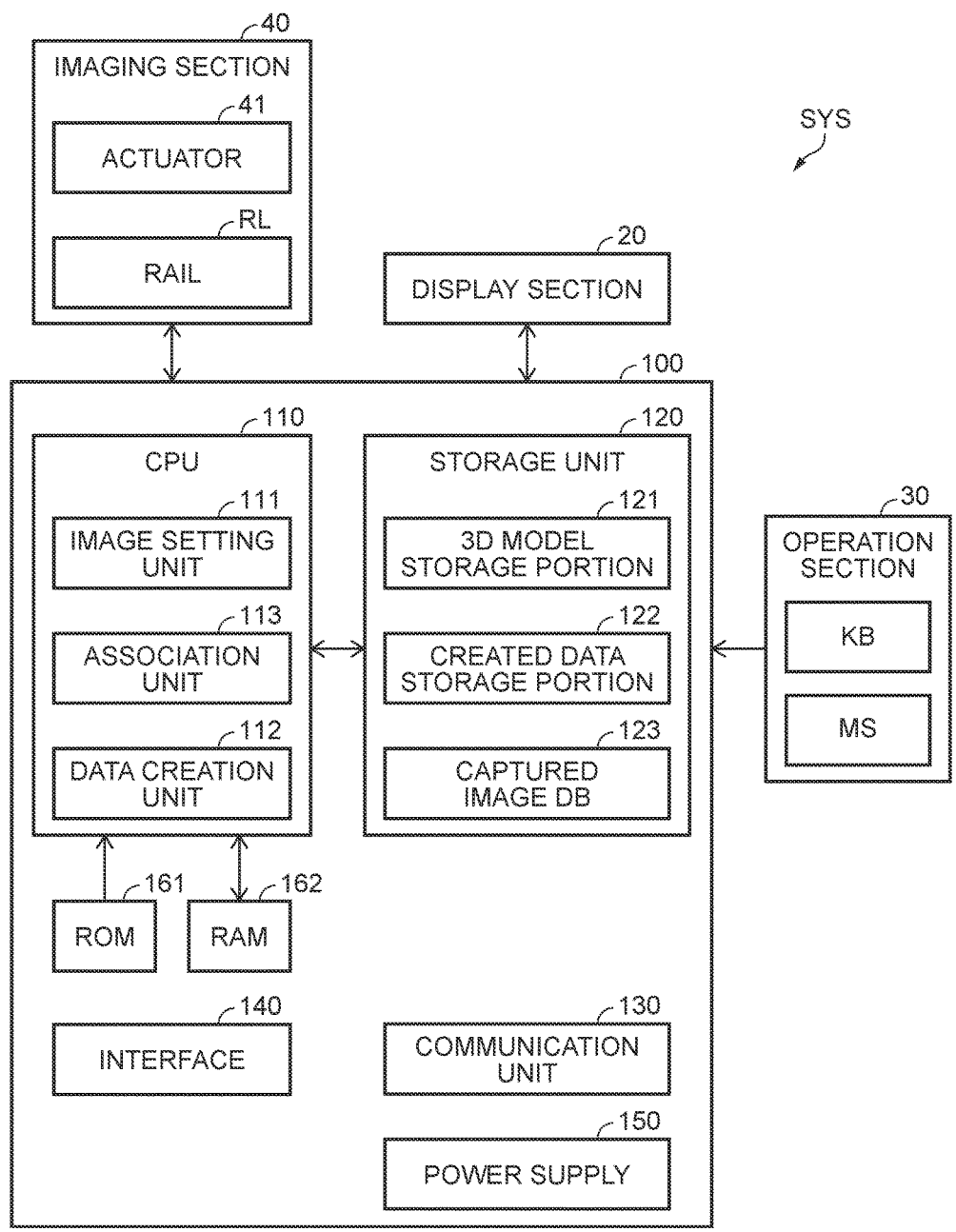
FIG. 2 is a block diagram illustrating a functional configuration of the image processing system.

FIG. 2 is a block diagram illustrating a functional configuration of the image processing system SYS. As illustrated in FIG. 2, the main body section 100 includes a CPU 110 including one or more processors, a storage unit 120, a ROM 161, a RAM 162, a communication unit 130, an interface 140, and a power supply 150. The storage unit 120 stores various items of data, and is constituted of a hard disk drive and the like. The storage unit 120 includes a 3D model storage portion 121, a created data storage portion 122, and a captured image database 123 (captured image DB 123).

The 3D model storage portion 121 stores a 3D model (3D CAD model) created by using computer-aided design (CAD) as a 3D model corresponding to a shape and a structure of the real object OB1. The created data storage portion 122 stores data created by the CPU 110. As details of data stored in the created data storage portion 122 will be described later, the created data storage portion 122 stores association data in which 2D model data corresponding to a predetermined view of a 3D model, appearance data of the real object OB1 imaged by the imaging section 40, and the predetermined view are associated with each other. The captured image database 123 stores a captured image obtained by imaging the real object OB1 in the imaging section 40. The captured image stored in the captured image database 123 is one imaging frame of the real object OB1 imaged from a specific location, a moving image obtained by imaging the real object OB1, or the like.

The CPU 110 reads various programs from the ROM 161 and develops the programs in the RAM 162, so as to execute the various programs. The CPU 110 includes an image setting unit 111, a data creation unit 112, and an association unit 113. The image setting unit 111 sets an image displayed on the display section 20. For example, the image setting unit 111 displays an image of the real object OB1 captured by the imaging section 40, and a contour of a 2D model obtained on the basis of the 3D model of the real object OB1 stored in the 3D model storage portion 121, on the display section 20. The data creation unit 112 creates association data in which 2D model data obtained on the basis of the 3D model of the real object OB1 stored in the 3D model storage portion 121 is associated with image data (appearance data) of the real object OB1 captured by the imaging section 40. The data creation unit 112 stores the created association data in the created data storage portion 122. Details of data created by the data creation unit 112 will be described later.

The image setting unit 111 displays an image captured by the imaging section 40 on the display section 20. The image setting unit 111 displays a 2D model obtained by projecting a 3D model onto a virtual plane on the basis of a predetermined viewpoint, on the display section 20. In a case where the real object OB1 is imaged by the imaging section 40, the association unit 113 associates a contour of the imaged real object OB1 with the contour of the 2D model at a timing of receiving a predetermined command from a user, so as to estimate a pose of the imaged real object OB1. Details of estimation of a pose of the real object OB1 performed by the association unit 113 will be described later. If the association unit 113 completes estimation of the pose of the real object OB1, the image setting unit 111 displays a new 2D model obtained by projecting the 3D model by using the estimated pose. At this time, the real object OB1 and the new 2D model displayed on the display section 20 overlap each other with higher accuracy.

The power supply 150 supplies power to the respective units of the image processing system SYS. For example, a secondary battery may be used as the power supply 150. The interface 140 is an interface which connects the main body section 100 to various external apparatuses OA which are content supply sources. As the external apparatuses OA, for example, a personal computer (PC), a mobile phone terminal, and a gaming terminal may be used. As the interface 140, for example, a USB interface, a microUSB interface, and a memory card interface may be used. The data creation unit 112 may acquire captured image data of the real object OB1 via the interface 140.

The communication unit 130 performs wireless communication with other apparatuses such as a content server, a television set, and a personal computer, on the basis of a predetermined wireless communication standard such as a wireless LAN or Bluetooth (registered trademark). The data creation unit 112 may acquire captured image data of the real object OB1 and/or programs that are to be loaded into the main body section 100 and used to realize functions described in the embodiments from other servers via the communication unit 130.

A-2. Data Creation without Using Marker

The data creation unit 112 may employ data creation based on a marker and data creation without using a marker in order to associate captured image data of the real object OB1 captured by the imaging section 40 with data based on the 3D model of the real object OB1 stored in the 3D model storage portion 121. Here, the data creation without using a marker will be described, and the data creation based on a marker will be described in a second embodiment.

A-2-1. Online Data Creation

Figure 3:
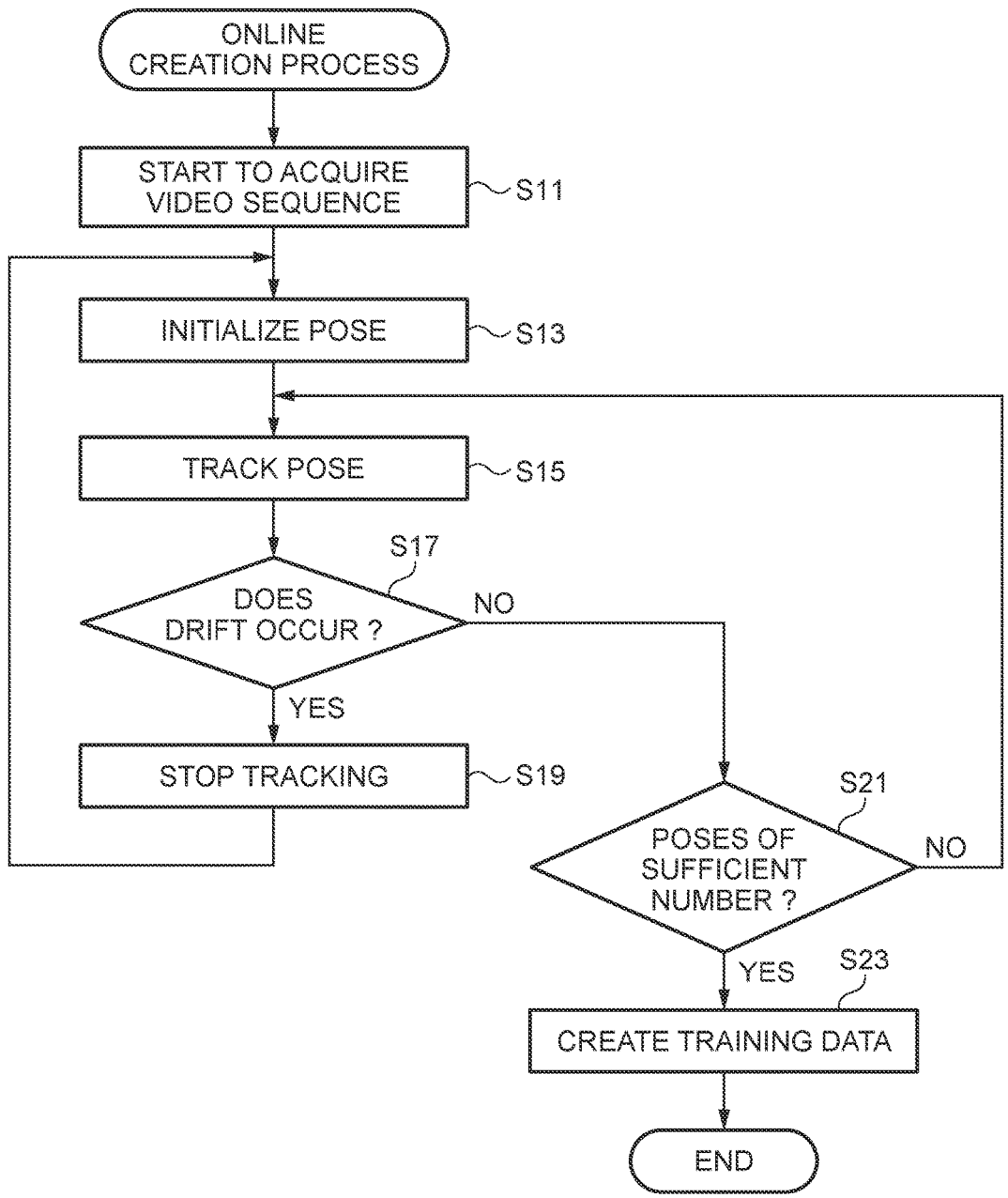
FIG. 3 is a flowchart illustrating an online creation process.

FIG. 3 is a flowchart illustrating an online creation process in which data is created without using a marker online. The program for realizing the online creation process is stored in a memory medium (specifically in this embodiment, ROM 161). Data creation without using a marker includes two data creation processes such as an online creation process in which appearance data is provided to "2D model data" while imaging an object with the imaging section 40, and an offline creation process in which appearance data is provided to "2D model data" by using captured image data of the real object OB1 prepared in advance. Here, the online creation process will be described, and the offline creation process will be described later.

Pose Initialization

In the online creation process, first, the CPU 110 starts to acquire a video sequence (step S11). In the acquisition of the video sequence, the CPU 110 prompts a user to image the real object OB1 by using the imaging section 40. The image setting unit 111 displays the image of the real object OB1 on the display section 20. Simultaneously, the image setting unit 111 displays a 2D model obtained by projecting a 3D model onto a virtual plane on the basis of a predetermined view, on the display section 20. As a result, the real object OB1 imaged by the imaging section 40 and the projected 2D model are displayed so as to overlap each other on the display section 20, but, in this stage, an image contour of the real object OB1 is not aligned with a contour of the 2D model. Next, the association unit 113 performs initialization of the pose (step S13).

Figure 4:
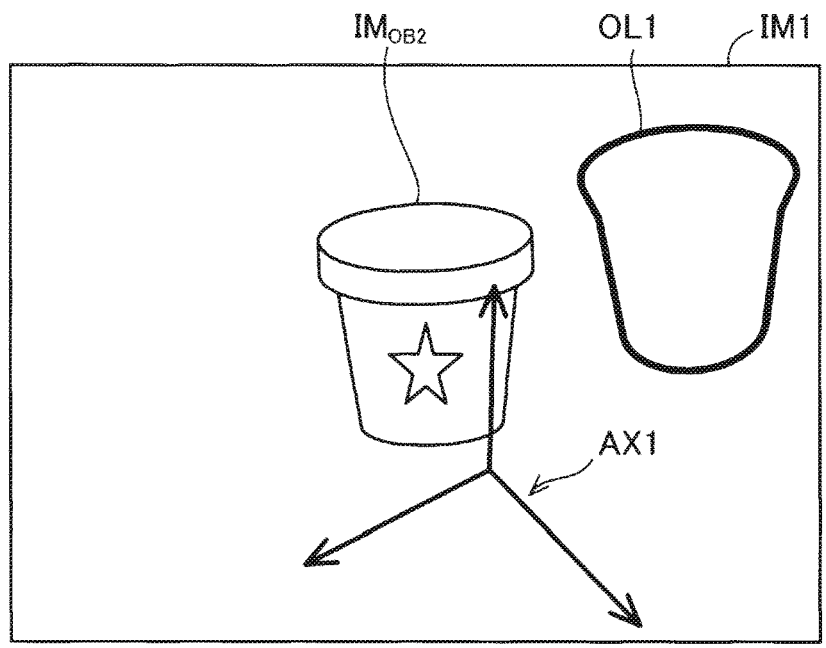
FIG. 4 illustrates a display image in which a contour of a 2D model and an image captured by an imaging section are displayed.
Figure 5:
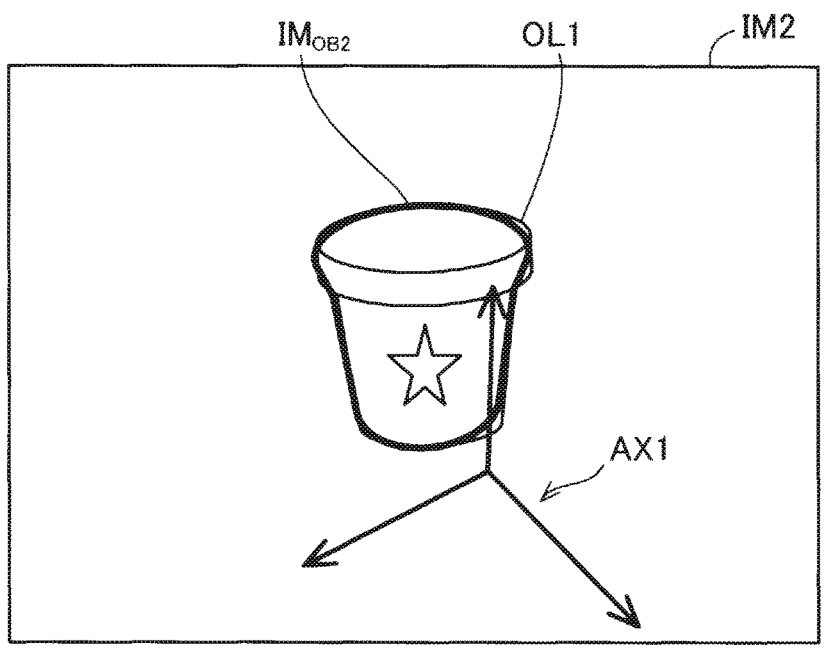
FIG. 5 illustrates a display image in the state where an image contour of a real object and a contour of a 2D model substantially coincide with each other.

FIG. 4 is a diagram illustrating a display image IM1 in which a contour OL1 of the 2D model and an image captured by an imaging section 40 are displayed on the display section 20. As illustrated in FIG. 4, the image of the real object OB1 captured by the imaging section 40 and displayed on the display section 20 is not aligned with the contour OL1 of the 2D model displayed on the display section 20. Thus, in the pose initialization process, the image setting unit 111 prompts the user to move the imaging section 40 so that the image contour of the real object OB1 is substantially aligned with the contour of the 2D model. The user is prompted to input a predetermined command to the operation section 30 in a case where the image contour of the real object OB1 is aligned with or substantially aligned with the contour of the 2D model. Coordinate axes AX1 illustrated in FIGS. 4 and 5 and the subsequent drawings are coordinate axes fixed to the real object OB1, and change depending on a change in a pose of the real object OB1 relative to the imaging section 40.

In a case where the operation section 30 receives the predetermined command, the association unit 113 searches on the image for image points corresponding to 2D model points included in the contour of the 2D model. Here, the 2D model points included in the contour of the 2D model may be selected in advance so as to be uniformly distributed along a contour line representing the 2D model. The image point corresponding to the 2D model point may be searched for by, for example, the CPU 110 selecting an image point having luminance gradient close to luminance gradient of the 2D model point from among a plurality of image points included in a region of neighborhood (for example, a pixel matrix of 3×3) centering on the 2D model point. The CPU 110 may compare two gradients with each other on the basis of an inner product between two vectors.

As part of the pose initialization of step S13, the association unit 113 optimizes a pose represented by a rigid body conversion matrix included in view parameters on the basis of the view and the depth map so that re-projection errors are minimized on a virtual plane (in this case, a plane corresponding to an imaging surface of the imaging section 40) on the basis of 3D model points obtained by inversely converting the 2D model points, and image points corresponding to the 2D model points. Optimization, that is, refinement of the pose is performed through iterative computations using, for example, the Gauss-Newton method. If the pose is optimized (refined), the image contour and the contour of the 2D model are aligned with each other on the display section 20 with higher accuracy. The above process is also referred to as "pose initialization". A pose represented by a view where the two contours are aligned with each other substantially matches the pose of the real object OB1 relative to the imaging section 40. Image information of the real object OB1 in the captured image is stored as appearance data in association with the pose. The appearance data according to the present embodiment includes texture information (information regarding an appearance such as an edge, a pattern, or a color) of an outer surface of the real object OB1 imaged by the imaging section 40 in the pose. An image point corresponding to the 2D model point is searched for by comparing detected edges with each other, but a well-known technique is applicable to edge detection, and, in other embodiments, an image point corresponding to a projected 2D model point may be searched for according to methods (for example, corner detection) other than the edge detection. In a case where the pose has been refined in the pose initialization, the CPU 110 may present information indicating that pose refinement is completed to the user via the display section. For example, the CPU 110 may change a color of the 2D model displayed on the display section 20 so as to present completion of the pose refinement to the user.

Pose Tracking

If the "pose initialization" is completed, the CPU 110 starts a process of tracking the pose of the real object OB1 (step S15). The pose tracking process according to the present embodiment is based on tracking of features (feature points) on the real object OB1 appearing in a captured image acquired by the imaging section 40. If preparation of the pose tracking process is completed, the CPU 110 prompts the user to move the imaging section 40 relative to the real object OB1. While the imaging section 40 is relatively being moved, a pose of the real object OB1 relative to the imaging section 40, or camera 40, is tracked by the CPU 110. The CPU 110 projects the 3D model onto the virtual plane by using the same pose as a pose of the real object OB1 updated through the tracking. Thus, even if the user moves the imaging section 40 while imaging the real object OB1, an image contour of the real object is kept substantially aligned with a contour of the 2D model on the display section 20. It is noted that an example of tracking the pose of the real object OB1, but is not limited to, is to track the image feature points of the scene including the real object included in image frames from camera 40, and to apply bundle-adjustment to the image feature points between the image frames.

In a case where a spatial relationship (a pose relative to the imaging section 40) between the imaging section 40 and the real object OB1 becomes a predetermined spatial relationship, the CPU 110 acquires image information of the real object OB1 in the spatial relationship as appearance data. The acquired appearance data is stored in association with the spatial relationship (pose) and "2D model data" in the pose. The "2D model data" includes at least one of an image representing a contour (contour line) of the 2D model and "contour feature information" representing the contour. The "contour feature information" includes locations of 2D model points included in the contour and luminance gradients at the locations.

Figure 7:
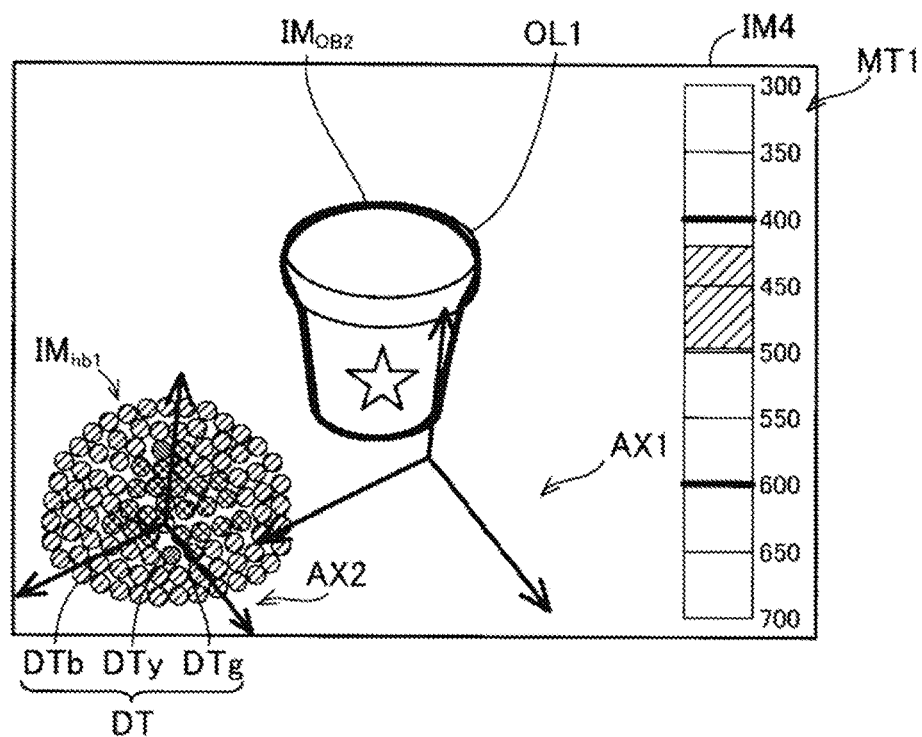
FIG. 7 illustrates a display image displayed on display section while a CPU is tracking the pose of a real object.
Figure 8:
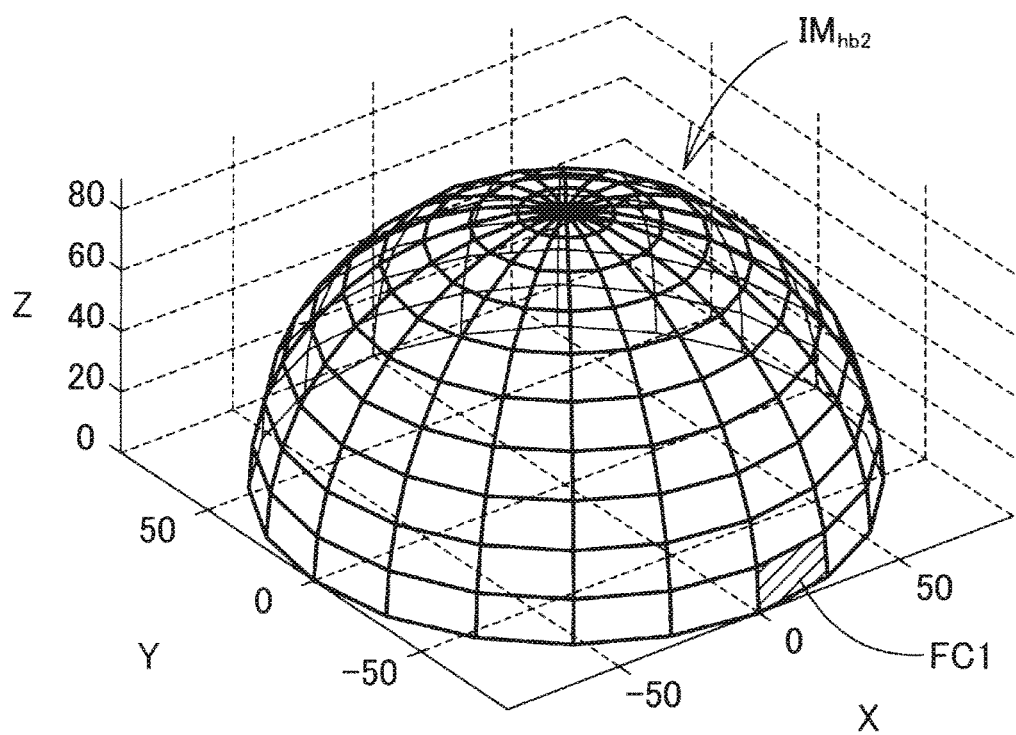
FIG. 8 shows details of respective dots forming a hemisphere image.

FIG. 7 illustrates a display image IM4 for prompting the user to image the real object OB1 in the predetermined spatial relationship. In FIG. 7, the spatial relationships are expressed by a plurality of dots DT included in the display image IM4. The dots DT are distributed on a surface of a hemisphere image $IM_{hb2}$ illustrated in FIG. 8. XYZ axes of a coordinate system of the hemisphere are represented in an object coordinate system, and the origin thereof corresponds to a point on the real object OB1 or the 3D model. A region FC1 that forms a part of the surface of the hemisphere image $IM_{hb2}$ corresponds to a dot. Similarly, other regions on the surface correspond to respective dots.

The dots DT in the display image IM4 change in three colors. A blue dot DTb indicates a state in which appearance data of the real object OB1 has not been obtained yet in the spatial relationship represented by the dot DTb. A green dot DTg indicates that appearance data has been obtained in the spatial relationship represented by the dot DTg. A yellow dot DTy indicates that more appearance data is required to be obtained in the spatial relationship represented by the dot DTy. In other words, if all the dots DT change from the blue dots DTb to the green dots DTg, this notifies the user that appearance data of the real object OB1 has been acquired in all of the predetermined spatial relationships. In the present embodiment, the "location" includes the concept of "orientation", and, thus, even if coordinate values of the imaging section 40 do not change, a state in which an orientation of an optical axis of the imaging section 40 changes is also referred to as a state in which a location of the imaging section 40 changes.

Figure 6:
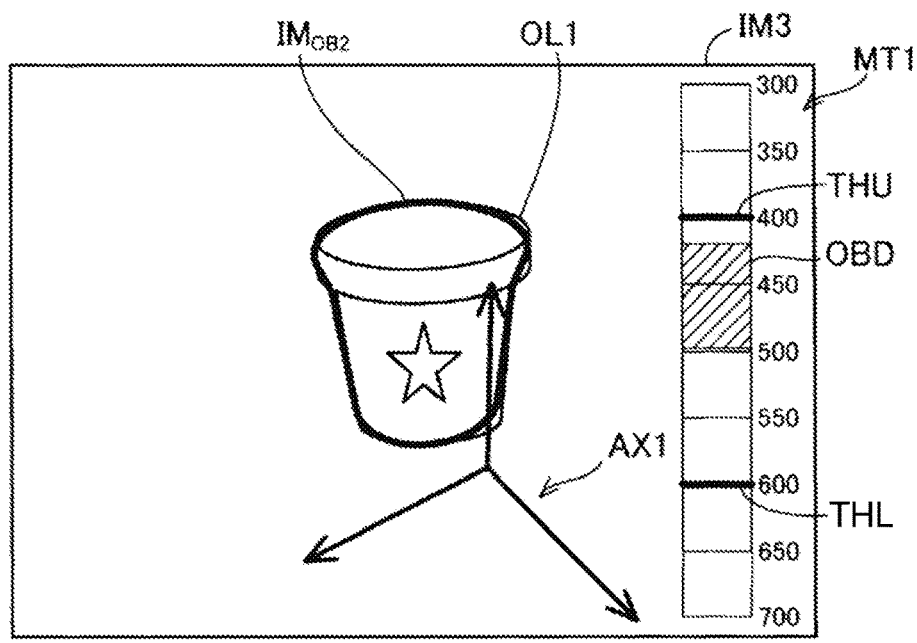
FIG. 6 illustrates a display image displayed when an object distance is compared with a threshold.

In order to cause the user to recognize a distance between the imaging section 40 and the real object OB1 in the predetermined spatial relationship, a display image IM3 illustrated in FIG. 6 may be displayed. As illustrated in FIG. 6, in the display image IM3, a meter MT1 is further displayed on the display section 20 compared with the display image IM2 illustrated in FIG. 5. The meter MT1 is an image indicating a distance (hereinafter, referred to as an object distance) between the imaging section 40 and the real object OB1. The meter MT1 includes a threshold value upper limit THU, a threshold value lower limit THL, and an object distance OBD (hatched region). The threshold value upper limit THU indicates an upper limit of a preset range of threshold values. The threshold value lower limit THL indicates a lower limit of the preset range of threshold values. The object distance OBD indicates an object distance included in a spatial relationship specified by the data creation unit 112. The reason why the object distance OBD indicates a predetermined range is that a distance specified by the data creation unit 112 has a predetermined width.

If template data created through the above-described process is used, in a case where the real object OB1 is detected by using an HMD (head-mounted display device), and an AR object is rendered on the real object OB1, spatial relationships are diversified, or increased, in which a pose of the real object OB1 can be initially detected or initially estimated with high accuracy by using a camera of the HMD.

Stoppage of Pose Tracking

In a case where features of the real object OB1 vanishes or motion blurring occurs in a captured image acquired by the imaging section 40 during pose tracking, a tracked pose may be drifted. In this case, tracking of a pose may be stopped. Pose initialization is preferably performed again in the pose whose tracking is stopped. Then, a pose at the time of acquiring appearance data and a pose at the time of projecting a 3D model to obtain a 2D model are kept matched each other with high accuracy over a plurality of poses (spatial relationships) to be sampled.

Therefore, if the process in step S15 in FIG. 3 is completed, the data creation unit 112 determines whether or not a pose is drifted during tracking of a pose (step S17). The determination may be performed by a user input on the basis of observation performed by the user, or through analysis in the CPU 110 based on tracking. In a case where the data creation unit 112 determines that drift is detected (YES in step S17), the data creation unit 112 stops pose tracking (step S19) and returns to step S13 so as to perform pose initialization again since there is a concern that an accurate pose of the real object OB1 may not be specified.

In a case where it is determined that drift is not detected in the process in step S17 (NO in step S17), the data creation unit 112 determines whether or not a sufficient amount of appearance data of the real object OB1 has been acquired (step S21). In the present embodiment, in a case where all of the dots DT forming a hemisphere image $IM_{hb1}$ illustrated in FIG. 7 change to the green dots DTg, the data creation unit 112 determines that a sufficient amount of appearance data of the real object OB1 has been acquired. The hemisphere image $IM_{hb1}$ is associated with the coordinate axes AX2.

In a case where it is determined that a sufficient amount of appearance data of the real object OB1 has not been acquired in the process in step S21 of FIG. 3 (NO in step S21), the data creation unit 112 successively repeatedly performs processes in step S15 and the subsequent steps. In a case where it is determined that a sufficient amount of appearance data of the real object OB1 has been acquired in the process in step S21 (YES in step S21), the data creation unit 112 finishes tracking of a pose of the real object OB1, creates association data (also referred to as a template or training data) in which a spatial relationship (pose), the appearance information of the real object OB1 in the spatial relationship, and the 2D model data are associated with each other (step S23), and finishes the online creation process. The data creation unit 112 stores the created association data (also referred to as template data) in the created data storage portion 122.

As mentioned above, in the image processing system SYS of the present embodiment, the data creation unit 112 substantially overlaps the image contour $IM_{OB2}$ of the real object OB1 and the contour OL1 of the 2D model displayed on the display section 20 with each other, in response to an operation received via the operation section 30. The data creation unit 112 creates association data in which a spatial relationship between the imaging section 40 and the real object OB1 at that time, the appearance data of the real object OB1 imaged by the imaging section 40 in the spatial relationship, and the 2D model data are associated with each other. The data creation unit 112 stores the created association data in the created data storage portion 122. Thus, according to the image processing system SYS of the present embodiment, appearance data acquired on the basis of captured image data can be provided to a template which is obtained on the basis of a 3D model (for example, a 3D CAD model) not having appearance data (texture information) which is information regarding an appearance of an outer surface of an object. Through this association, the template has the texture information (surface appearance data) obtained on the basis of the captured image in addition to feature information (for example, contour information) obtained on the basis of the 3D model. The HMD refers to the template having the surface appearance data when detecting the real object OB1 and estimates a pose thereof, and thus the detection accuracy of an initial pose of the real object OB1 can be improved compared with a case of referring to a template not having the appearance data. In the image processing system SYS of the present embodiment, if the imaging section 40 can image the real object OB1, the data creation unit 112 can create a template (association data), and thus it is possible to create a template (association data) having appearance data without using a complex device.

A-2-2. Offline Data Creation

An offline data creation process is different from the online data creation process in terms of "pose tracking".

Figure 9:
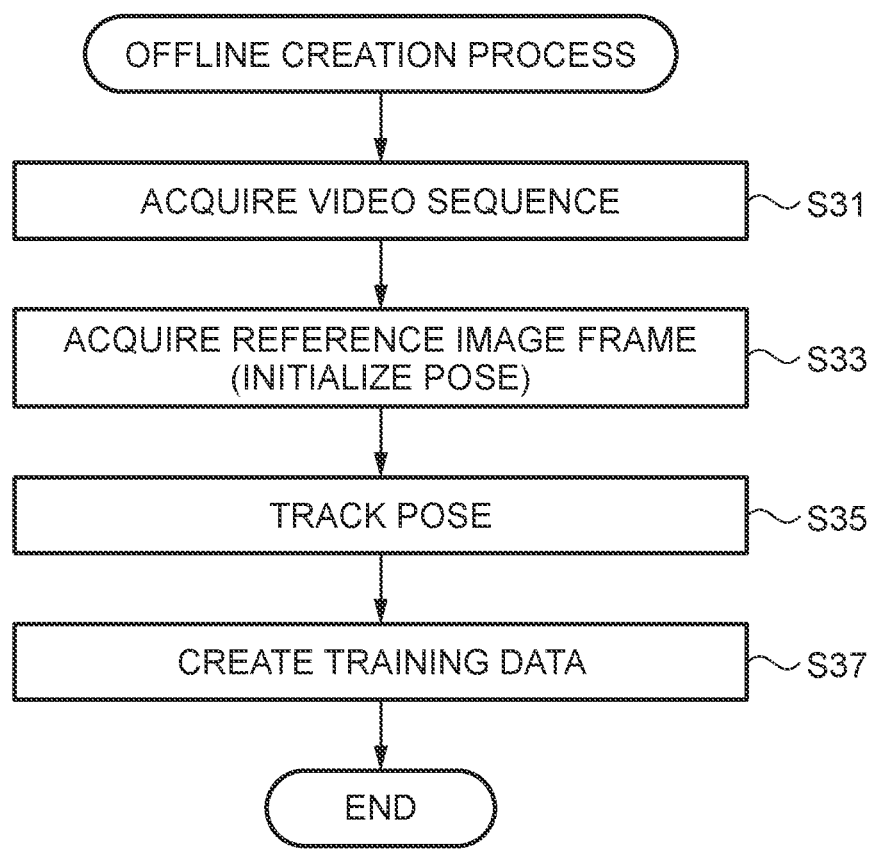
FIG. 9 is a flowchart of an offline creation process.

FIG. 9 is a diagram illustrating a flow of the offline creation process. The program for realizing the offline creation process is stored in a memory medium (specifically in this embodiment, ROM 161). In the offline creation process, first, the CPU 110 performs acquisition of a video sequence (step S31). In the performed acquisition of the video sequence, a user images the real object OB1 with the imaging section 40 in advance. At this time, the imaging section 40 is relatively moved so that poses of the real object OB1 relative to the imaging section 40 correspond to all spatial relationships represented by the dots in FIG. 7 or 8. The CPU 110 records the video sequence of the real object OB1 through the imaging in the imaging section 40. The CPU 110 selects an image frame in which the real object OB1 having a pose close to a pose represented in a predetermined view is imaged, from among image frames forming the video sequence. Regarding a method of selecting an image frame that is also referred to as a reference image frame in the present embodiment, the image frame may be automatically selected in image processing performed by the CPU 110, and may be selected by the user. A pose of the real object OB1 in the selected image frame is estimated. A method of estimating a pose may be the same as the method described in the process related to the online data creation process.

Next, the CPU 110 acquires a reference image frame (step S33). A pose of the real object OB1 imaged in each of the image frames in the preceding and succeeding of the time axis with respect to the selected image frame is tracked (step S35). In this case, bundle adjustment is locally or entirely applied to the reference image frame, and thus estimation of the pose of the real object OB1 is refined with respect to each image frame. The appearance data of the real object OB1 is acquired and is recorded at a predetermined timing. Training data is created in which the acquired appearance data is associated with the pose, and "2D model data" of the 2D model obtained by projecting the 3D model in the pose (step S37), is stored as a template, and the offline creation process is finished.

As described above, in the image processing system SYS of the present embodiment, the data creation unit 112 uses a video sequence recorded by imaging the real object OB1 in advance, as captured image data of the real object OB1, when creating association data in the offline creation process. Therefore, in the offline creation process, when the data creation unit 112 estimates a pose of the real object OB1, an image frame to which bundle adjustment is applied is used, and thus estimation of a pose can be refined. The data creation unit 112 can partially solve the problem of the occurrence of drift by using such image frames.

B. Second Embodiment

In a second embodiment, in a case where a preset marker is present in an imaging region of the imaging section 40 in addition to an object, the imaging section 40 performs estimation and tracking of a pose of the real object OB1 with a coordinate axis set in the marker as a reference.

B-1. Configuration of Image Processing System

Figure 10:
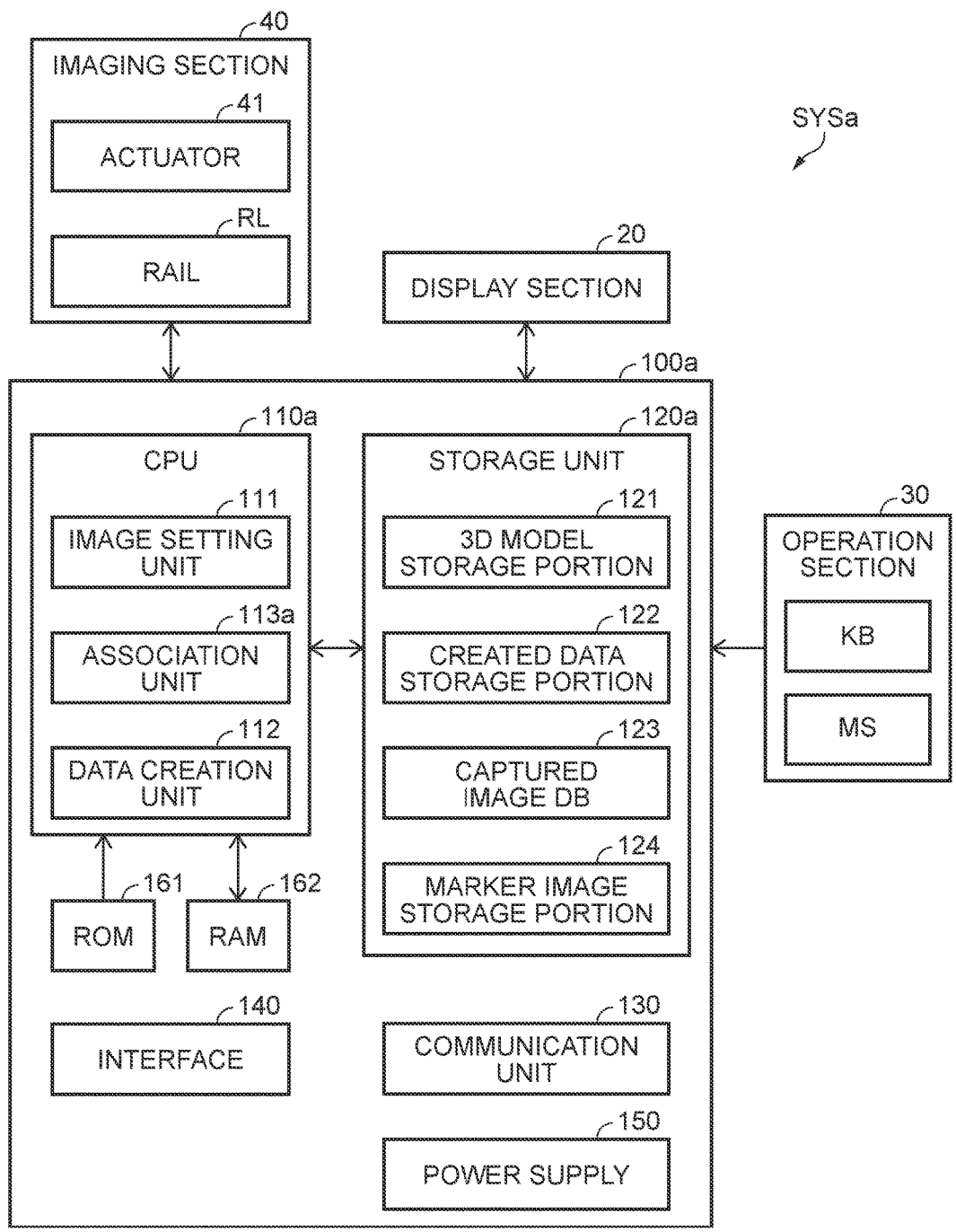
FIG. 10 is a functional block diagram illustrating an image processing system according to a second embodiment.

FIG. 10 is a block diagram illustrating a functional configuration of an image processing system SYSa in the second embodiment. The image processing system SYSa of the second embodiment is different from the image processing system SYS of the first embodiment in that a storage unit 120*a* includes a marker image storage portion 124, and an association unit 113*a* of a CPU 110*a* performs different processes. Thus, in the second embodiment, the same constituent elements as those of the image processing system SYS of the first embodiment will not be described.

The marker image storage portion 124 of the storage unit 120*a* stores a preset marker model. The marker model represents a plane marker, but a marker coordinate system is represented by three axes (an X axis, a Y axis, and a Z axis) which are orthogonal to each other.

B-2. Data Creation Based on Marker

Pose Initialization

Figure 13:
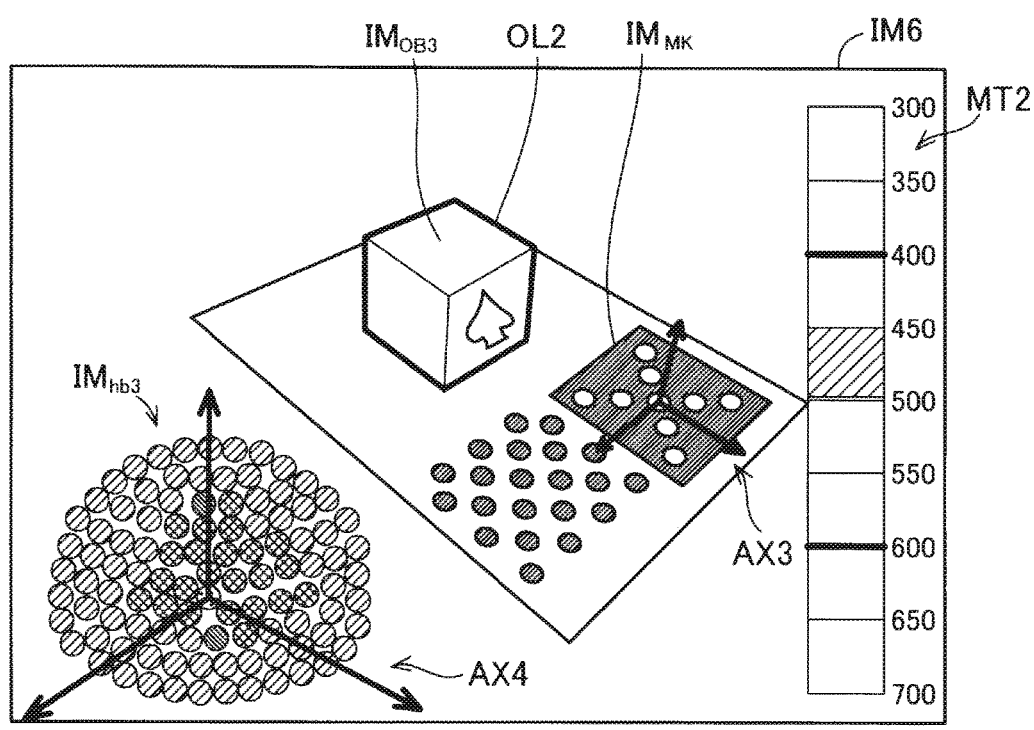
FIG. 13 illustrates a display image displayed on a display section during the tracking of the pose of an object.

Thereafter, even if the user moves the imaging section 40 relative to the real object OB1, it is possible to track a pose of the real object OB1 with higher accuracy on the basis of the pose of the plane marker and the pose Tmo between the plane marker and the real object OB1 (step S49). A 2D model obtained by projecting a 3D model onto a virtual plane on the basis of a predetermined pose is displayed so as to overlap the video sequence in the same method as the method described in the first embodiment, and the user aligns an image contour of the real object with a contour of the 2D model by operating the mouse or the like. With reference to FIG. 13, in a case where the image contour of the real object is substantially aligned with the contour of the 2D model, the CPU 110*a* stores appearance data in the pose and "2D model data" in the pose in association with each other. Alignment between the image contour of the real object and the contour of the 2D model in the CPU 110*a* may be determined on the basis of completion of deriving (optimization) of view parameters which minimize re-projecting errors between image points and 2D model points corresponding to each other, and/or may be determined on the basis of an instruction from the user based on naked eye observation when the optimization cannot be used. In the same manner as in the first embodiment, with respect to all poses represented by the dots DT in FIGS. 7 and 8, a pose of the real object OB1, appearance data in the pose, and "2D model data" in the pose are stored in association with each other. In a case where association data items are stored with respect to a predetermined number of poses (YES in step S51), the association data items are collected and stored as association data (training data) (step S53), and the process based on a marker is finished. In a case where association data items are not stored with respect to a predetermined number of poses (NO in step S51), the process returns to step S49, and the CPU 110*a* prompts the user to keep relatively moving the imaging section 40. As described in the first embodiment, the "2D model data" mentioned here includes at least one of an image representing a contour (contour line) of the 2D model and "contour feature information" representing the contour. According to another embodiment, it is noted that once the pose of the real object OB1 is estimated at Step S43, it is not necessary to perform Step S45 to track the pose of the real object OB1, since the CPU 110*a* may track the pose of the real object OB1 by tacking the pose of the plane marker using the relationship represented by Tmo.

The CPU 110*a* may compute a reliability score for the derived pose, and may notify the user of the score via the UI. The user may accept the pose or may perform the process again in step S43 on the basis of the score. Unlike the method not using a marker described in the first embodiment, the estimated pose at this step is not included in training data (template).

The user keeps relatively moving the imaging section around the real object OB1 so as to collect video sequences from various angles and to continuously record the video sequences. During that time, the CPU 110*a* tracks a pose of the real object and continuously records the pose (step S45). If sufficient images are collected, the CPU 110*a* calls (activates) a multiview improvement algorithm (AutoFit) provided as a function of the PGE tool so as to perform the following process in response to a command from the user. First, the CPU 110*a* obtains a pose of the plane marker relative to the imaging section 40 with respect to each image frame included in the video sequence. In the present embodiment, a pose of the plane marker is derived according to a method using a nomography matrix. Generally, acquiring a 3D pose of the plane marker with high accuracy is easier than acquiring a 3D pose of any 3D object with high accuracy. An accurate pose (this pose is indicated by Tmo; here, the suffix o indicates an object coordinate system, the suffix m indicates a marker coordinate system, and T indicates a conversion matrix between both of the coordinate systems) between the plane marker and the real object by using each tracked pose of the real object OB1 and a pose of the plane marker included in each same image frame is estimated (step S47). The above-described steps S41 to S47 correspond to the pose initialization of the first embodiment.

Thereafter, even if the user moves the imaging section 40 relative to the real object OB1, it is possible to track a pose of the real object OB1 with higher accuracy on the basis of the pose of the plane marker and the pose Tmo between the plane marker and the real object OB1 (step S49). A 2D model obtained by projecting a 3D model onto a virtual plane on the basis of a predetermined pose is displayed so as to overlap the video sequence in the same method as the method described in the first embodiment, and the user aligns an image contour of the real object with a contour of the 2D model by operating the mouse or the like. In a case where the image contour of the real object is substantially aligned with the contour of the 2D model, the CPU 110*a* stores appearance data in the pose and "2D model data" in the pose in association with each other. Alignment between the image contour of the real object and the contour of the 2D model in the CPU 110*a* may be determined on the basis of completion of deriving (optimization) of view parameters which minimize re-projecting errors between image points and 2D model points corresponding to each other, and/or may be determined on the basis of an instruction from the user based on naked eye observation when the optimization cannot be used. In the same manner as in the first embodiment, with respect to all poses represented by the dots DT in FIGS. 7 and 8, a pose of the real object OB1, appearance data in the pose, and "2D model data" in the pose are stored in association with each other. In a case where association data items are stored with respect to a predetermined number of poses (YES in step S51), the association data items are collected and stored as association data (training data) (step S53), and the process based on a marker is finished. In a case where association data items are not stored with respect to a predetermined number of poses (NO in step S51), the process returns to step S49, and the CPU 110*a* prompts the user to keep relatively moving the imaging section 40. As described in the first embodiment, the "2D model data" mentioned here includes at least one of an image representing a contour (contour line) of the 2D model and "contour feature information" representing the contour. According to another embodiment, it is noted that once the pose of the real object OB1 is estimated at Step S43, it is not necessary to perform Step S45 to track the pose of the real object OB1, since the CPU 110*a* may track the pose of the real object OB1 by tacking the pose of the plane marker using the relationship represented by Tmo.

C. Third Embodiment

Figure 11:
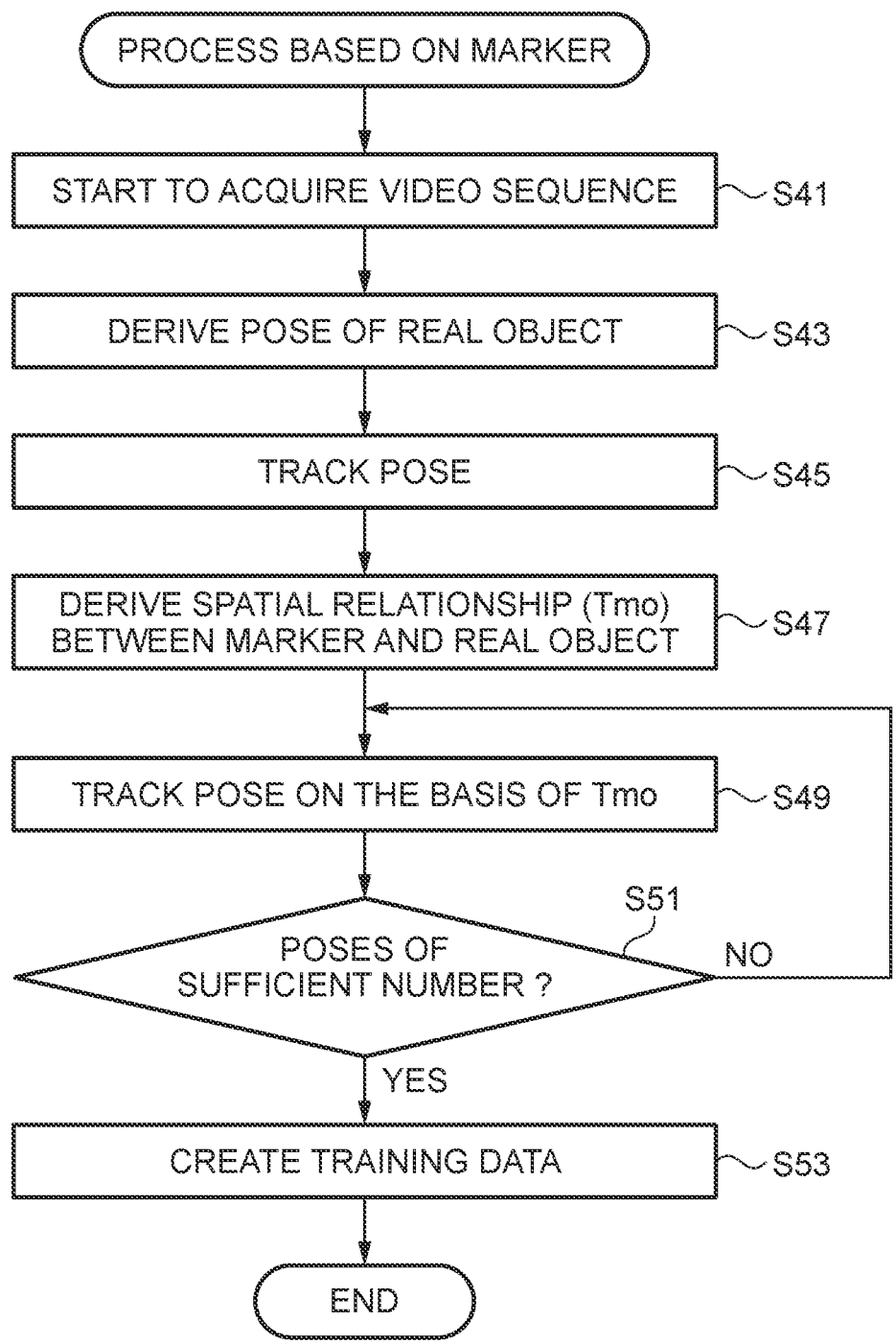
FIG. 11 is a flowchart of an online creation process.
Figure 12:
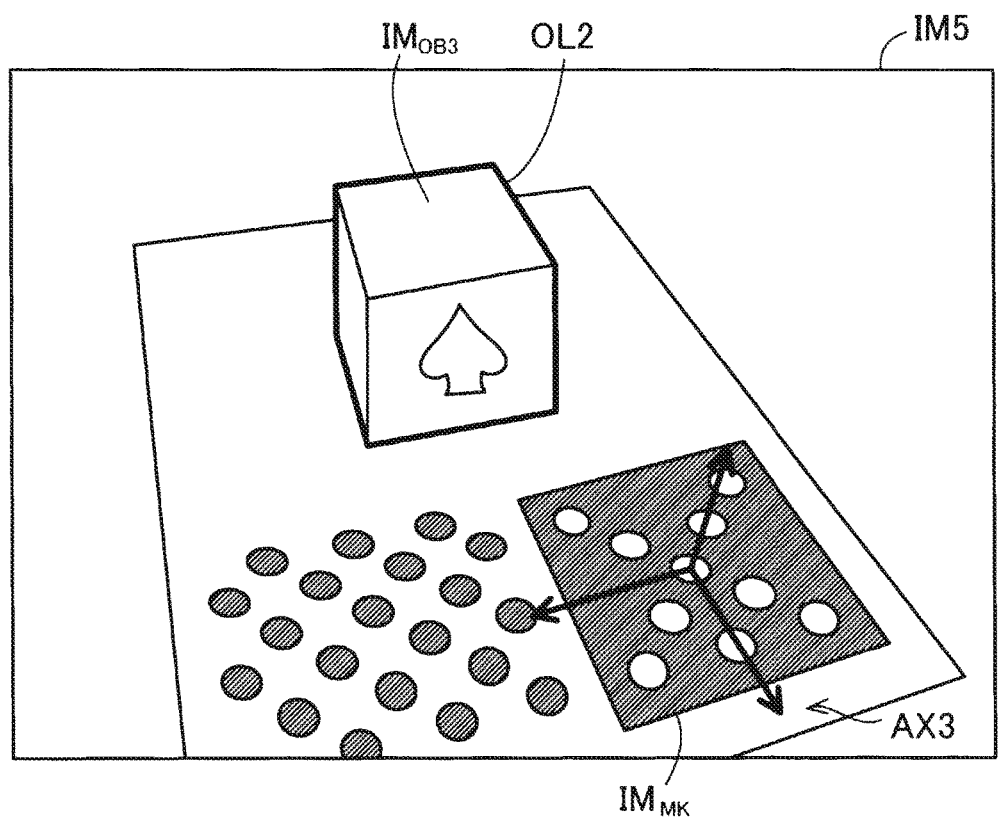
FIG. 12 illustrates a display image including coordinate axes displayed when a marker image is captured.
Figure 14:
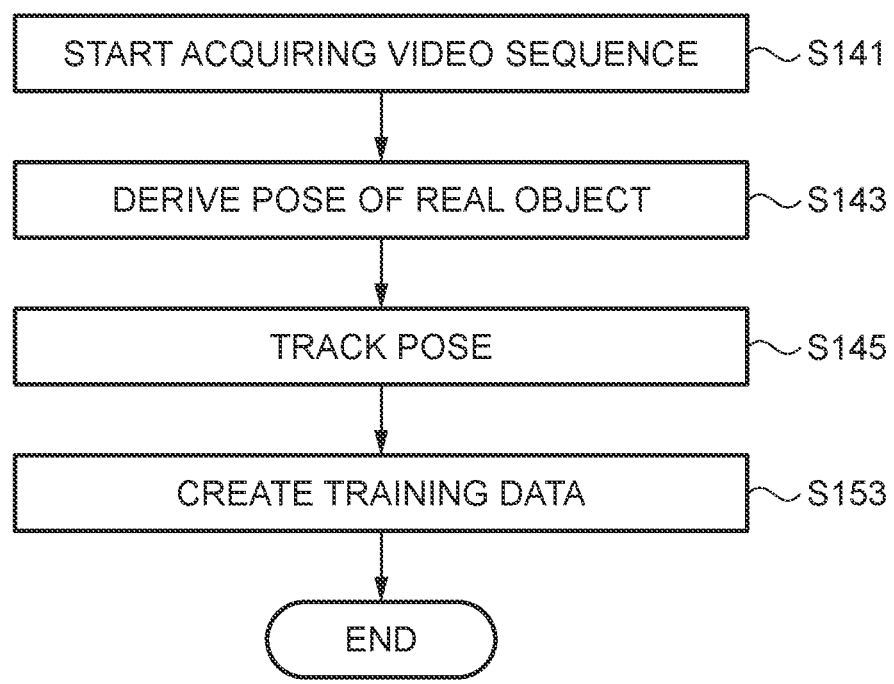
FIG. 14 is a flowchart of an online creation process.

FIG. 14 shows a flow in a third embodiment. The program to realize this flow is stored in a storage medium (specifically, the ROM 161). The flow shown in FIG. 14 is equivalent to the flow shown in FIG. 11 as the second embodiment from which steps S47, S49 and S51 are eliminated. Therefore, the contents of the third embodiment can be roughly understood from the second embodiment. However, as understood from the description below, in the third embodiment, unlike the second embodiment, a marker is used to display a hemisphere image but need not be used to detect or track a pose of a real object OB1. The third embodiment will be described below.

First, the user is made to capture a still image or dynamic image (video sequence) of a real object OB1, using the imaging section 40 in an arbitrary pose to the real object OB1 (step S141). When an image frame is selected, the pose of the real object is derived (step S143). The selection of the image frame is executed as described in the offline creation process shown in FIG. 9.

The CPU 110 displays one image frame including the real object OB1 on the display section 20. The CPU 110 displays, on the display section 20, a contour based on a 2D model obtained by projecting a 3D model corresponding to the shape of the real object OB1 onto a virtual plane based on a predetermined (default) view. Consequently, the contours of the real object OB1 and the 2D model are displayed as being superimposed. However, normally, the image contour of the real object OB1 and the contour of the 2D model do not coincide with each other at this stage.

The CPU 110 prompts the user to adjust the view where the 3D model is projected, in such a way that the image contour of the real object OB1 and the contour of the 2D model coincide with each other. Specifically, the CPU 110 prompts the user to update the rotations about the three axes included in the view and the translations along the three axes, using an interface such as a mouse or touch pad. The CPU 110 displays a 2D model obtained by projecting a 3D model on a virtual plane, based on a new view including the updated rotations and translations. The CPU 110 displays a predetermined text on the display section 20 and thereby prompts the user to cause the image contour of the real object OB1 and the contour of the 2D model displayed on the display section 20 to be coincident with each other via an operation on the mouse or the like. Also, the CPU 110 prompts the user to notify the CPU 110 of the timing when the image contour of the real object OB1 and the contour of the 2D model become coincident with each other, via a predetermined interface. The CPU 110 starts an algorithm to minimize re-projection error between the image points in the image frame and the projected 2D model points, using the three rotations and the three translations at the time of receiving the notification as an initial pose representing the pose of the real object OB1, and thus refines the pose estimated for the real object OB1. As the pose is refined, the image contour of the real object OB1 and the contour of the 2D model coincide with each other with higher accuracy on the display section 20. In this case, the CPU 110 may present information indicating that the refinement of the pose is finished, to the user via the display section 20. For example, the CPU 110 may inform the user that the refinement of the pose is finished, by changing the color of the 2D model displayed on the display section 20.

Then, the CPU 110 stores the appearance information of the real object OB1 and "2D model data" corresponding to this pose, in association with each other in the storage unit. Moreover, if a dynamic image of the real object OB1 is captured, the pose of the real object OB1 is tracked through a plurality of image frames preceding and following the image frame where the pose of the real object OB1 is refined, based on the relationship between 3D points on the 3D model and 2D points included in the real object OB1 on the image frame (3D-2D relationship) (step S145). Then, training data is created (step S153). That is, the appearance information of the real object OB1 in all or some image frames is added to templates corresponding to the respective poses, along with the information representing the poses.

According to this embodiment, at least effects similar to those of the first and second embodiments can be achieved. With respect to one or a plurality of spatial relationships between the imaging section 40 and the real object OB1, each piece of appearance information of the real object OB1 is added to the corresponding template. Even when template data created by a process like this is used, the HMD can realize highly accurate initial estimation of the pose of the real object OB1, using the camera on the HMD, when detecting the real object OB1 and rendering an AR object in such a way as to correspond to the real object OB1.

D. Fourth Embodiment

According the embodiment below, whether adding appearance information to templates is useful or not can be determined before creating template data according to the foregoing embodiment. Specifically, if there are many feature points on the surface of the real object, appearance information is added to templates created from the 3D model, as described in the foregoing embodiment. If it is not determined that there are many feature points, appearance information need not be added.

Figure 15:
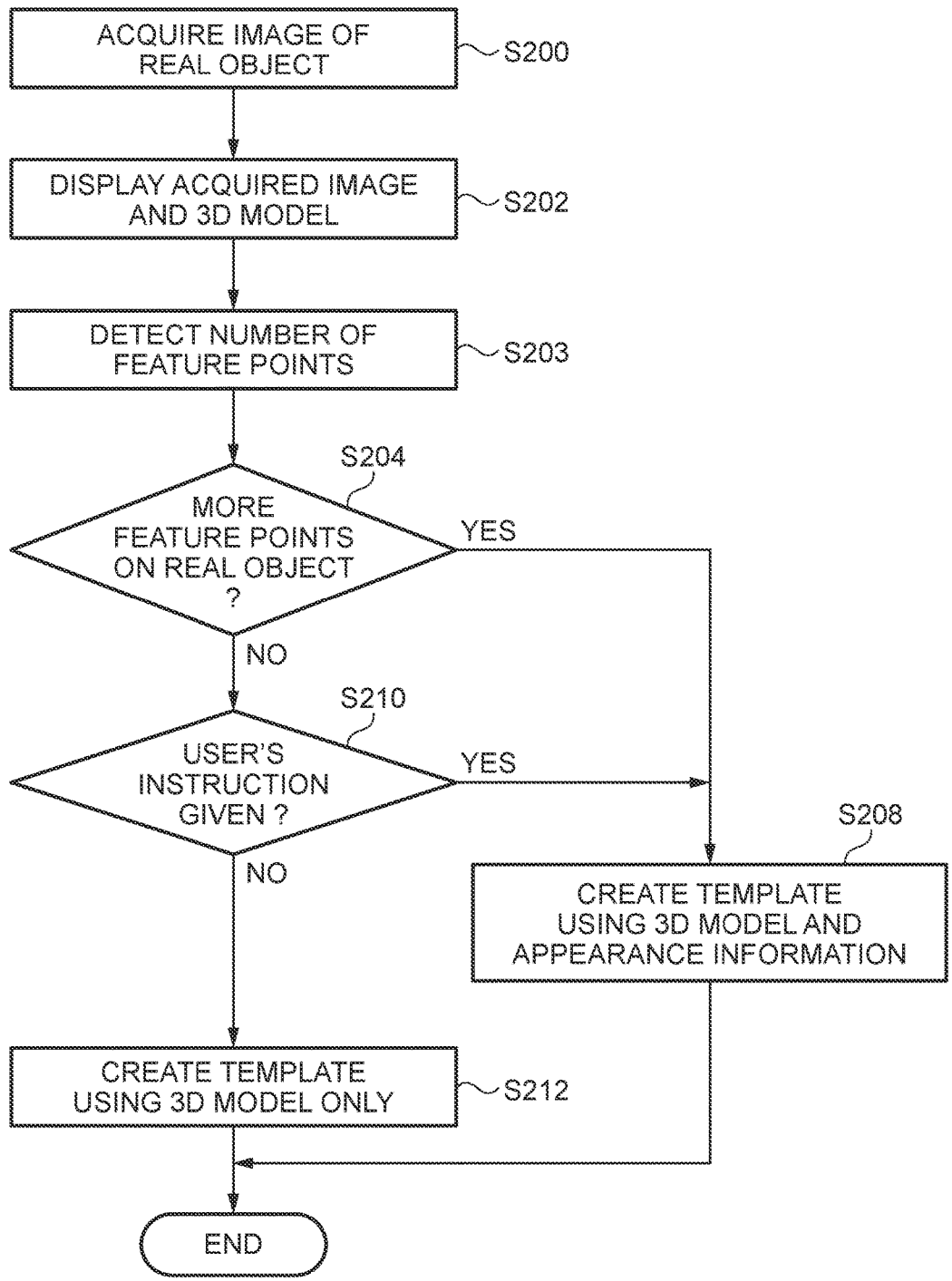
FIG. 15 is a flowchart of an online creation process.

FIG. 15 shows a flow according to this embodiment. The program to realize this flow is stored in a storage medium (specifically, the ROM 161). The flow in this embodiment will be described, referring to FIG. 15.

In step S200, the CPU 110 acquires an image (image data) of a real object OB1 captured by the imaging section 40.

In step S202, the acquired image is displayed on the display section 20 and a 3D model corresponding to the real object OB1 is displayed (rendered) on the display section 20, based on a predetermined view. Then, the user is prompted to adjust the position and pose of the 3D model with a mouse or the like in such a way that the contour of the real object OB1 and the contour of the displayed 3D model (hereinafter referred to as 2D model) substantially coincide with each other. Specifically, at this time, the CPU 110 changes the conversion matrix used to render the 3D model, in response to the user's operation, and thus renders the 3D model on the display section, based on the changed conversion matrix. Thus, the CPU 110 can determine the contour (range) of the real object OB1 on the image.

Next, in step S203, the number of the feature points within the contour of the real object OB1 is found by a known technique such as the Harris feature point detection, ORB feature point detection or Canny edge detection. Subsequently, the CPU 110 determines the type of real object of the real object OB1. Specifically, if the number of the feature points exceeds a predetermined value (Yes in step S204), this real object OB1 is labeled as a feature-rich object (real object OB1 with many feature points) and the process goes on to step S208. If the number of the feature points is below the predetermined value (No in step S204), this real object OB1 is labeled as a low-feature real object (real object with few feature points) and the process goes on to step S212 via step S210 (described later).

In step S208, a template (training data) is created using the 3D model and the appearance information of the real object OB1 by the method described in the foregoing embodiment. Meanwhile, in step S212, a template is created using only the 3D model that is saved. In this embodiment, before going on to step S212, there is a step of causing the user to check in step S210. If the user gives an instruction, the process goes on to step S208 even if it is not determined that there are many feature points in step S204. Thus, appearance information is acquired and added to the template.

E. Modifications

In the foregoing embodiments, the image processing system SYS is used as an information processing system for creating association data. However, various modification can be made to the system for creating association data. For example, an HMD having the imaging section 40 may be employed. The HMD is a kind of computer. Also, while only one imaging section 40 is provided in the first embodiment, images of real objects OB1, OB2 may be captured by a plurality of imaging sections 40. As a method for imaging the object OB2 with the imaging section 40, the position of the imaging section 40 may be fixed and the position of the object OB2 may be changed, instead of changing the position of the imaging section 40. For example, the object OB2 may be arranged on a rotatable rotating table and an image of the object OB2 may be captured by the imaging section 40 fixed in position. Also, both of the imaging section 40 and the object OB2 may changed in position.

In the first embodiment, the imaging section 40 captures an image of the object OB2 and the data creation unit 112 optimizes the pose of the object OB2 captured in the image and the pose of the 3D model stored in the 3D model storage portion 121, using a video sequence obtained in parallel with the imaging. However, the optimization need not necessarily be carried out using such a video sequence. After a series of video sequences is acquired by the imaging section 40 and stored in the storage unit, the data creation unit 112 may execute the optimization of the coincidence of the poses. The data creation unit 112 does not necessarily need a video sequence captured from the entire circumference of the object OB2. For example, if there is an image $IM_{OB2}$ of the object OB2 captured from a specific viewpoint, the data creation unit 112 can create association data as viewed from the specific viewpoint.

The appearance information of the real object acquired by the imaging section 40 in the specification is data including at least one item of information that is not included in the 3D model stored in the 3D model storage portion 121. While texture information (pattern, color, roughness and texture) of the outer surface of the object is given as an example of the appearance information, the appearance information is not limited to these.

The rail RL need not necessarily be used in order to move the imaging section 40. For example, the user may hold the imaging section 40 in the hand and move the imaging section 40.

This disclosure is not limited to the above embodiments and modifications and can be realized with various configurations without departing from the scope of the disclosure. For example, technical features in the embodiments and modifications corresponding to technical features in the respective configurations described in the summary section can be adaptively replaced or combined in order to solve a part or the entirety of the foregoing problems or in order to achieve a part or the entirety of the foregoing advantageous effects. Also, such technical features can be adaptively deleted unless described as essential in the specification.

The entire disclosure of Japanese patent application No. 2016-222221, filed on Nov. 15, 2016, is expressly incorporated by reference herein.

What is claimed is:

1. A non-transitory computer readable medium that embodies instructions that cause one or more processors to perform a method for training an object detection algorithm, the method comprising:
    detecting feature elements based at least on an image frame obtained from capturing a real object with a camera; and
    generating a template for a pose of the real object in the image frame using (i) a 3D model corresponding to the real object and (ii) appearance information of the real object when the number of the feature elements is equal to or greater than a threshold value, the template associating the appearance information with data of a 2D model obtained from a projection of the 3D model in the pose.

2. The non-transitory computer readable medium according to claim 1, wherein the appearance information is texture information of the real object in the pose in the image frame captured with the camera.

3. The non-transitory computer readable medium according to claim 1,
    wherein the appearance information includes edge, pattern, or color features of the real object in the pose in the image frame captured with the camera.

4. The non-transitory computer readable medium according to claim 1,
    wherein the appearance information includes corner features of the real object in the pose in the image frame captured with the camera.

5. The non-transitory computer readable medium according to claim 1,
    wherein the appearance information is image data of the real object in the pose in the image frame captured with the camera.

6. A method for training an object detection algorithm, the method comprising:
    detecting feature elements based at least on an image frame obtained from capturing a real object with a camera; and
    generating a template for a pose of the real object in the image frame using (i) a 3D model corresponding to the real object and (ii) appearance information of the real object when the number of the feature elements is equal to or greater than a threshold value, the template associating the appearance information with data of a 2D model obtained from a projection of the 3D model in the pose.

7. The method according to claim 6,
    wherein the appearance information is texture information of the real object in the pose in the image frame captured with the camera.

8. The method according to claim 6,
    wherein the appearance information includes edge, pattern, or color features of the real object in the pose in the image frame captured with the camera.

9. The method according to claim 6,
    wherein the appearance information includes corner features of the real object in the pose in the image frame captured with the camera.

10. The method according to claim 6
    wherein the appearance information is image data of the real object in the pose in the image frame captured with the camera.

* * * * *